United States Patent [19]

Scatá et al.

[11] 4,263,169

[45] Apr. 21, 1981

[54] CATALYSTS AND CATALYST COMPONENTS USEFUL FOR POLYMERIZING OLEFINS

[75] Inventors: Umberto Scatá; Giuliano Cecchin, both of Ferrara, Italy

[73] Assignee: Montedison S.p.A., Milan, Italy

[21] Appl. No.: 28,964

[22] Filed: Apr. 11, 1979

[30] Foreign Application Priority Data

Apr. 12, 1978 [IT] Italy ............................ 22208 A/78

[51] Int. Cl.$^3$ ............................ C08F 4/02; C08F 4/64
[52] U.S. Cl. ............................ 252/429 B; 252/431 R; 252/431 C; 252/431 N; 252/431 P; 526/125; 526/129; 526/128; 526/140; 526/141; 526/142; 526/143
[58] Field of Search ........... 252/429 B, 431 R, 431 C, 252/431 N, 431 P

[56] References Cited

U.S. PATENT DOCUMENTS

| | | | |
|---|---|---|---|
| 3,642,746 | 2/1972 | Kashiwa et al. | 252/429 B X |
| 3,647,772 | 3/1972 | Kashiwa | 252/429 B X |
| 3,833,515 | 9/1974 | Amtmann et al. | 252/429 B |
| 3,859,231 | 1/1975 | Kochhar et al. | 252/429 B X |
| 3,953,414 | 4/1976 | Galli et al. | 252/429 B X |
| 3,989,879 | 11/1976 | Berger et al. | 252/429 B X |
| 4,013,823 | 3/1977 | Longi et al. | 252/429 B X |
| 4,082,692 | 4/1978 | Goldie | 252/429 B |
| 4,107,413 | 8/1978 | Giannini et al. | 252/429 B X |
| 4,111,835 | 9/1978 | Foschini et al. | 252/429 B X |
| 4,149,990 | 4/1979 | Giannini et al. | 252/429 B |

*Primary Examiner*—Patrick Garvin

[57] ABSTRACT

There are disclosed new catalyst-forming components obtained by reacting at least the following substances:
(a) a halogenated Ti compound containing at least one Ti-halogen bond;
(b1) a support an essential constituent of which is a mixture of an oxygenated Mg compound with an adduct between a Mg dihalide and at least one electron-donor compound and/or with the product of decomposition of said adduct containing Mg dihalide; and/or
(b2) the product obtained by treating an oxygenated Mg compound with an electron-donor compound.

Also disclosed are catalysts prepared from said new catalyst-forming components, as is use of the catalysts in the polymerization of olefins, more particularly olefins $CH_2=CHR$ in which R is an alkyl or aryl radical having 1–8 carbon atoms, of mixtures of said olefins and of mixtures thereof with ethylene.

17 Claims, No Drawings

CATALYSTS AND CATALYST COMPONENTS USEFUL FOR POLYMERIZING OLEFINS

THE PRIOR ART

Catalysts having a high activity and stereospecificity in polymerizing alpha olefins are known and are obtained by reacting an Al-alkyl compound with a Ti compound supported on a Mg halide in activated form (German Pat. No. 2,643,143).

It is also known that it is possible to prepare Ziegler-type catalysts for polyethylene endowed with high activity starting from reaction products of halogenated Ti compounds and supports consisting of Mg oxide, Mg hydroxide and Mg salts of oxygenated acids. These catalysts, suitably modified with electron-donor compounds (or Lewis bases), can be utilized for the stereoregular polymerization of the alpha-olefins; their activity, however, is not sufficiently high and in any case not such as to avoid after-purification of the polymer to remove catalyst residues.

Attempts were made to improve the performance of said modified Ziegler-type catalysts by subjecting the oxygenated Mg compound to pre-halogenation treatments. However, the results obtained were not satisfactory.

THE PRESENT INVENTION

Catalysts having characteristics comparable to those described in German Pat. No. 2,643,143 in the polymerization of the alpha-olefins $CH_2+CHR$ as defined herein, but prepared from supports comprising oxygenated Mg compounds, such as the oxide, hydroxide, hydroxyhalides, and Mg salts of oxygenated acids have not been disclosed heretofore.

One object of this invention is to provide catalyst component supported on supports comprising oxygenated Mg compounds and which form catalysts that are comparable to those of the German Patent in the polymerization of the alpha-olefins.

Said object and others which will become apparent are achieved by this invention because we have found that, surprisingly, it is possible to obtain catalysts endowed with high activity and stereospecificity for the polymerization of the alpha-olefins $CH_2=CHR$, in which R is an alkyl or aryl radical having 1—8 C atoms, starting from supports including Mg oxygenated compounds, if such oxygenated compounds are subjected to particular pre-treatment prior to the reaction with the Ti compound, comprising, among other pre-treatments, partially converting the oxygenated compound into an adduct between a Mg dihalide and an electron-donor compound ED or, preferably, an electron-donor compound containing activated hydrogen atoms (compound HED).

The catalysts so obtained offer, among other things, the advantage that the polymers produced in the presence thereof do not lead to corrosion phenomena in the apparatuses (extruders, etc.), used for the transformation of the polymers into shaped articles, even when the polymer contains relatively high amounts of halogenated compounds.

The catalyst components according to this invention consist of the product obtained by reacting at least the following substances:
(a) a halogenated Ti compound containing at least one Ti-halogen bond;
(b) a support the essential constituents of which are:
  (b1) an oxygenated Mg compound selected from the oxide, hydroxide, hydroxyhalide of Mg, salts of Mg of oxygenated acids and Mg dihalides in the form of adducts with at least one electron-donor compound HED and/or ED, each being present in an amount higher than 0.1 mole per mole of dihalide, and/or a decomposition product of said adduct, the molar ratio between oxygenated compound and Mg dihalide, either combined or not, ranging from 0.05:1 to 20:1; and/or
  (b2) the product obtained by treating an oxygenated compound of the type specified in (b1) with an electron-donor compound ED or mixtures thereof with HED, in amounts respectively of at least 0.1 mole of compound ED and HED per mole of oxygenated compound, the reaction system comprising also and ED compound or adducts thereof at least in the case when such compound is not contained in support (b) in combined or non-combined form, the amount of ED compound present in the catalyst component in combined form not extractable with $TiCl_4$ at 80° C. ranging from 0.05 to 5 moles per mole of Ti compound present after such treatment.

Preferably, at least 50% of the Ti compound is not soluble in $TiCl_4$ at 80° C. and, more preferably, at least 50% of said compound is not soluble in $TiCl_4$ at 135° C.

In a presently preferred embodiment, the adduct contained in support (b1) comprises an electron-donor compound HED in amounts ranging from 0.1 to 6 moles per mole of Mg dihalide. When the adduct contains also the ED compound, the latter is present in amounts comprised between 0.1 and 1 mole of dihalide.

Support (b1) may be prepared by various methods. A presently preferred method consists in reacting, according to known techniques, an oxygenated Mg compound of the type specified hereinbefore with a halogenating agent capable of converting, at least partially, the oxygenated compound into Mg dihalide, operating under such conditions that from about 5% up to 95% of the oxygenated compound is converted to dihalide.

The halogenating reaction can be conducted in the presence of electron-donor compound HED and/or ED; in this case the adduct between Mg dihalide and compound HED and/or ED is formed in situ. It is preferable, however, to cause such reactions to occur successively. More particularly, the product of the prehalogenation is reacted first with HED and then with ED. It is also possible to react compound ED during the reaction with the Ti halogenated compound.

As halogenating agents it is possible to employ sulphuryl or thionyl chloride, phosgene, organic halides, hydrogen halides, carboxylic acid halides, ammonium halides, or Al-, B-, P- and Si-halides.

Specific examples of useful halogenating agents are, besides those already mentioned, hydrogen chloride and hydrogen bromide, $CCl_4$, benzoyl chloride, $POCl_3$, $SiCl_4$, halo silanes, $AlCl_3$, and Al-alkyl halides such as $Al(C_2H_5)_2Cl$; $Al_2(C_2H_5)_3Cl_3$.

The reaction is generally conducted by suspending the Mg oxygenated compound in the halogenating compound, if the latter is liquid under the reaction conditions, and by heating the mixture to temperatures lower than the decomposition temperature of the halogenating compound and generally ranging from 40° to 120° C.

If the halogenating compound is gaseous under the reaction conditions, it is possible to flow vapors thereof over the oxygenated compound. When a hydrogen halide is used, the resulting Mg halide contains hydration water. It is not necessary to anhydrify the product to obtain satisfactory results.

When $Cl_2$ is employed as halogenating agent, then the reaction is carried out in the presence of CO and at temperatures generally higher than 400° C.

Another method of preparing support (b1) and which is one of the presently preferred methods consist in heating, according to conventional methods, a Mg hydrated halide under conditions in which dehydration and partial hydrolysis of the dihalide take place. Depending on the temperature, mixtures of Mg dihalide with Mg hydroxyhalide and/or Mg oxide are thus obtained. A full anhydrification of the starting dihalide is not required. Water amounts in the final product up to 0.5 mole per mole of dihalide are allowable without negatively affecting the catalyst performances. Preferably, the starting dihalides contain 1-2 moles of $H_2O$ and are heated to temperatures generally ranging from 350° to 550° C. The resulting product is then reacted with electron-donor compounds HED and ED.

According to another preparation method, the Mg oxygenated compound is mixed, in the already mentioned ratios, with a preferably anhydrous Mg dihalide, by operating, for example, in a mill, whereupon the product is reacted with compounds HED and ED. It is also possible to mix with each other the Mg oxygenated compound and the adduct that has previously formed between Mg dihalide and compound HED and, optionally, compound ED, or support (b1) can be prepared by reacting the Mg dihalide with compound HED and ED, operating in the presence of an oxygenated compound.

In some instances, it may be advisable to pre-treat support (b1) containing the adduct with compound HED and optionally with ED, with a compound capable of reacting with compound HED and to form Mg dihalide. For example, one can operate according to the methods described in French Pat. No. 7,724,238 using, e.g., $SiCl_4$ or an Al-alkyl compound.

It has been found, and this is another feature of the present invention, that the Mg oxygenated compound does not necessarily have to be prehalogenated and reacted with compound HED prior to the reaction with the halogenated Ti compound, but that said Ti compound can act as a halogenating agent. In this case, the Mg oxygenated compound is subjected to a pre-treatment with compound ED or mixtures thereof with HED employed in amounts respectively of at least 0.1 mole and up to about 5 moles per mole of oxygenated compound. The resulting product is then reacted with the Ti halogenated compound. 0.1 to 3 moles of compound ED and 0.5 to 2 moles of compound HED are preferably employed in the pre-treatment, which is carried out at a temperature generally comprised between 40° and 120° C. and the resulting suspension is successively reacted with the Ti compound.

The reaction with the Ti compound can be conducted in the presence of a halogenating agent other than the Ti compound. For example, it is possible to operate in the presence of anhydrous hydrogen chloride, which permits an increase in both the amount of Ti compound that remains fixed on the support and in the performance of the resulting catalyst.

As disclosed hereinbefore, when support (b1) is prepared by pre-halogenating the Mg oxygenated compound and by converting the Mg halide so obtained into an adduct with compounds HED and/or ED, the reaction leading to the formation of the adduct is preferably carried out after the halogenation reaction. One method of operating consists in reacting the halogenated product separated from the reaction mixture and then suspended in a hydrocarbon solvent with compound HED and ED, preferably used in amounts respectively ranging from 0.2 to 2 moles and from 0.1 to 0.5 mole per mole of starting oxygenated compound. The reaction temperature may be comprised in a wide range, for example, from 40° to 120° C.

As also disclosed hereinabove, the reaction between the Ti compound and support (b) is conducted in the presence of a compound ED or of adducts thereof with Lewis acids, at least when such compound is not contained in the support either in a combined or non-combined form. It is necessary, in fact, that the catalytic component always contain a certain amount of compound ED in a combined form non-extractable with $TiCl_4$ at 80° C.

The reaction with the Ti compound is carried out according to different methods. A presently preferred method consists in suspending support (b) in the liquid Ti compound and in heating the suspension to temperatures of from 60° to 150° C. for stretches of time sufficient to fix the Ti compound on the support in a form non-extractable with $TiCl_4$ at 80° C. On completion of the reaction, the solid product is separated under conditions in which Ti compounds soluble in $TiCl_4$ at 80° C. do not precipitate on it, and the solid product is then washed until all traces of free Ti compound are eliminated.

The amount of Ti compound, expressed as Ti metal, that remains fixed on the catalyst component in a form non-extractable with $TiCl_4$ at 80° C., is generally comprised between 0.1 and 20% by weight. More particularly, the amount of Ti compound, expressed as Ti metal, that remains fixed on the catalyst component after extraction with $TiCl_4$ at 135° C. is comprised between 0.2 and 5% by weight.

The general principle followed when carrying out the reaction between the Ti compound and the support is that of operating under such conditions that the product resulting from the reaction between the Ti compound and electron-donor compound HED and optionally ED of the adduct contained in the support is removed to the greatest possible extent from such support, for example by solubilization in the reaction medium.

The adduct between the Mg dihalide and electron-donor compound HED and/or ED may contain, in a combined form, besides the aforesaid compounds, also other compounds, such as, e.g., Lewis acids other than the Mg halide.

The useful Mg oxygenated compounds include, as already disclosed herein, oxides, hydroxides, oxyhalides of Mg and Mg salts of organic and inorganic oxygenated acids. Said compounds are preferably utilized in the anhydrous state. However, they may contain also hydration water in amounts preferably lower than 2 moles per mole of Mg compound. In the case of MgO and $Mg(OH)_2$, for example, it is possible to employ products containing up to about 1 mole of chemically non-combined water.

Some specific examples of Mg compounds are MgO, mixed oxides of Mg, Al and/or Si, hydroxide, hydroxychloride and bromide of Mg, carbonate and basic carbonate of Mg, basic carbonates of Mg and Al such as, for example, hydrotalcite, Mg nitrate, Mg phosphates and silicates, Mg carboxylates such as acetate, stearate, benzoate, oxalate, p-toluate and terephthalate of Mg, products obtained from the dehydration, under hydrolysis conditions, of hydrated Mg-halides, and products resulting from the partial thermal decomposition of Mg carboxylates.

As already mentioned herein, the Mg compounds used in the practice of this invention can be, also, in the form of complex compounds with compounds of other metals, e.g., Al, Fe, Mn, or of double salts or solid solutions.

Hydrocarbyl electron-donor compounds HED are selected from the aliphatic, cycloaliphatic, aromatic alcohols with 1–20 carbon atoms, the phenols, silanols, polysiloxane compounds containing OH groups, thioalcohols, thiophenols, primary and secondary amines, amides and ammonia.

Examples of specific useful HED compounds are ethanol, butanol, 2-ethylhexanol, octanol, cyclohexanol, phenol, t-butylphenol, triethylhydroxysilane, diethyldihydroxysilane, methyl-hydropolysiloxane and thioethanol.

Any electron donor compound Ed is suitable. Preferably compounds Ed are selected from the alkyl, aryl or cycloalkyl esters of the carboxylic acids, in particular from the esters of the aromatic acids.

Other examples of useful ED compounds are halides and anhydrides of carboxylic acids, in particular of aromatic acids, ethers, ketones, tertiary amines and amides.

Some specific examples of useful ED compounds are the alkyl esters (methyl, ethyl, butyl esters etc.), of benzoic acid and of derivatives thereof such as, for example, p-toluic acid, benzoyl chloride, benzoic anhydride, n-butylether, isoamylether and acetophenone.

Compound ED, when it is reacted in the form of adduct with the dihalide and, optionally, with the HED compound, is generally employed in amounts comprised between 0.1 and 1 mole per mole of Mg dihalide.

The Ti compounds used in practicing this invention contain at least one Ti-halogen bond and are preferably selected from the Ti tetrahalides, in particular $TiCl_4$ and the Ti halogen-alcoholates, for example, $(nC_4H_9O)_2\cdot TiCl_2$ or $TiCl_3OCH_3$.

The catalytic component containing the compounds of tetravalent Ti can be subjected to conventional treatments for reducing such compound to a lower valence, in particular to valence three, for example, by reduction with Al-alkyl compounds.

The catalysts according to the present invention are prepared by reacting an Al-alkyl compound, in particular Al-trialkyl and mixtures thereof with an Al-dialkyl halide, with the above-described catalyst-forming components. The Al/Ti ratio is generally comprised in a wide range, for example, from 1 to 1,000.

In the case of the polymerization of the alpha-olefins, it is preferable to employ an Al-trialkyl compound such as, for example, Al-triethyl, Al-triisobutyl, in the form of addition products thereof with electron-donor compounds, in which the amount of reacted Al-alkyl compound ranges from 10 to 90%.

When use is made of an Al-alkyl compound partially complexed with an electron-donor compound, the Al/Ti ratio is generally higher than 20 and comprised between 30 and 300.

The electron-donor compound to be reacted with the Al-alkyl compound can be the same compound as employed in the reaction for preparing the catalyst component including the Mg oxygenated compound. Preferably, it is an alkyl, aryl or cycloalkyl ester of an aromatic acid and in particular of benzoic acid and derivatives thereof.

The olefins polymerizable with the catalysts of this invention include ethylene, propylene, butene-1, 4-methyl-pentene-1, styrene and mixtures thereof.

The polymerization processes are of the known type, namely the polymerization is carried out in the liquid phase, either in the presence or absence of an inert hydrocarbon diluent, such as butane, pentane, hexane, heptane; or it is carried out in the gaseous phase.

The polymerization temperature is comprised in a wide range, for example, between 50° and 150° C., preferably between 60° and 90° C. The pressure can be the atmospheric pressure or higher.

In the case of the polymerization of propylene, the catalysts are utilized for preparing both propylene homopolymer and random copolymers of propylene with ethylene, and polymeric compositions obtained, for example, by polymerizing at first propylene and, successively, in one or more steps, ethylene or mixtures thereof with propylene. The ethylene content of these compositions can reach about 30% by weight.

The following examples are given to illustrate the present invention in more detail and are not intended to be limiting.

EXAMPLE 1

(a) Preparation of the catalyst component 8.1 g of MgO (200 millimoles; commercially pure) were fed to a jacketed glass reactor having a 500-ml capacity, equipped with a filtering fritted bottom, and in to 238 g (2 moles) of thionyl chloride ($SOCl_2$) were introduced. The suspension, under stirring, was heated to boiling (77° C.) for a contact time of 2 hours, whereupon $SOCl_2$ in excess was removed by hot filtering and the residual solid was washed with hexane at 60° C. until disappearance of the chlorine ion from the filtrate. The resulting solid product was suspended again, in the same reactor, in a solution containing 3 g (20 m. moles) of ethyl benzoate and 2.3 g (50 m. moles) of ethanol diluted with 100 ml of anhydrous hexane. The suspension was heated 1 hour to 60° C. Then the solvent was evaporated at 30° C. under moderate vacuum (40 Torr). The residual solid product was reacted with 110 ml of $TiCl_4$ (1 mole) at 100° C. for 2 hours. The $TiCl_4$ was then removed by filtration at 100° C. and the residual solid was washed with heptane until disappearance of the chlorine ion.

(b) Polymerization of propylene in hexane (solvent)

5.05 m. moles of a mixture of Al-butyls (54.5% moles of Al-i-$Bu_3$ and 45.5% moles of Al-n-$Bu_3$) were reacted at room temperature with 1.69 m.moles (254 mg) of methyl p-toluate in 80 ml of anhydrous hexane in 5 minutes. 30 ml of this solution, diluted with 50 ml of anhydrous hexane, were contacted with 2 ml of the catalyst component suspension prepared as described in (1a) for a 5-minute contact time. This suspension was introduced, in a pure nitrogen atmosphere, into a stainless steel autoclave having a total volume of 2.5 l, equipped with a magnetic screw stirrer and a thermocouple, and containing 870 ml of propylene-saturated hexane at 40° C. Successively, the remaining 50 ml of the solution Al-butyl and methyl p-toluate were introduced in a propylene flow.

After closing the autoclave, 250 Ncc of hydrogen were introduced, raising the temperature to 60° C. and simultaneously bringing the total pressure to 9 kg/cm$^2$ gauge with propylene. The pressure was kept constant by continuously feeding the monomer.

After 2 hours the polymerization was stopped by means of quick degassing and cooling of the polymeric slurry. The solvent was evaporated from the polymeric slurry. The dry polymer obtained (470 g) contained the following catalyst residues: Ti=7.5 ppm; Mg=112 ppm; Cl=186 ppm. The yield was 133,500 g of polypropylene/g of Ti, and the residue of the extraction with boiling heptane was equal to 93.5% by weight.

EXAMPLE 2

(a) Preparation of the catalyst component 8.1 g (200 m.moles) of MgO were reacted, as in Example (1a), for 2 hours at 77° C. with 238 g of SOCl$_2$. The solid product so obtained, after removal of SOCl$_2$ by washings with hot hexane, was suspended in a solution containing 3 g (20 m.moles) of ethyl benzoate and 9.22 g (200 m.moles) of ethanol diluted with 100 ml of hexane. This suspension was reacted at 60° C. for 2 hours. Then the solvent was evaporated, as already described, and the solid was reacted with 181 ml (1.65 moles) of TiCl$_4$ at 110° C. for 2 hours.

Before filtering the TiCl$_4$, 45 ml of heptane were introduced, whereupon the whole was filtered at 110° C. After the washings with heptane, a portion of the catalyst component suspension was dried. The analysis of the resulting solid was as follows: Ti=2.96% by weight; ethyl benzoate=4.65% by weight.

(b) Polymerization of propylene in hexane (solvent)

0.8 ml of the suspension in heptane of the catalyst component prepared in 2(a) were utilized under the conditions of the propylene polymerization test described in 1(b). After a 4-hour polymerization there were obtained 363 g of dry polymer, having the following catalyst residues: Ti=6 ppm; Mg=47 ppm; Cl=105 ppm. The yield was 166,500 g of polypropylene/g of Ti, and the residue of the extraction with boiling heptane was equal to 90.5% by weight.

EXAMPLE 3

(a) Preparation of the catalyst component

The starting material was chemically pure basic magnesium carbonate having the following composition: 4 Mg(CO$_3$).Mg(OH)$_2$.5H$_2$O. It was transformed into magnesium oxide by calcining in dry nitrogen at 400° C. for 69 hours.

81. g of this magnesium oxide (200 m.moles) were utilized to prepare the catalyst according to the procedure described in Example 2(a).

A portion of the suspension of the catalyst component in heptane at the end was dried. The dry solid product contained 3.15% by weight of Ti, 5.25% by weight of ethyl benzoate.

(b) Polymerization of propylene in hexane (solvent)

Use was made of 1 ml of the suspension in heptane of the catalyst component prepared in 3(a), under the polymerization test conditions specified in 1(b). After a 4-hour polymerization, 422 g of dry polymer were obtained, such polymer containing the following catalyst residues: Ti=5.7 ppm; Mg=50 ppm; Cl=154 ppm. The yield was 175,500 g of polypropylene/g of Ti, with a residue of the extraction with boiling heptane equal to 92% by weight.

EXAMPLE 4

(a) Preparation of the catalyst component

Commercial type, chemically pure magnesium hydroxide was converted into magnesium oxide by calcining at 500° C. in dry nitrogen for 24 hours.

8.1 g (200 m.moles) of the magnesium oxide thus obtained were utilized to prepare the catalyst according to the modalities described in Example 2(a).

(b) Polymerization of propylene in hexane (solvent)

1 ml of the suspension in heptane of the catalyst component prepared in 4(a) was utilized under the polymerization test conditions described in 1(b). After a 4-hour polymerization, there were obtained 232 g of dry polymer that contained the following catalyst residues: Ti=6.7 ppm; Mg=234 ppm; Cl=273 ppm; the yield was of 149,000 g of polypropylene/g of Ti, the residue of the extraction with boiling heptane was equal to 88.5% by weight.

EXAMPLE 5

(a) Preparation of the catalyst component

Chemically pure magnesium oxide of the commercial type was calcined at 500° C. for 24 hours in a dry nitrogen atmosphere.

8.1 g (200 m.moles) of MgO, calcined as already described herein, were reacted with 238 g (2 moles) of SOCl$_2$ at 77° C. for 2 hours. After removal of the thionyl chloride by repeated washing of the residual solid with hexane at 60° C., the same was suspended again in a solution containing 3 g (20 m. moles) of ethyl benzoate and 14.82 g (200 m.moles) of n-BuOH diluted in 100 ml of hexane.

The suspension was reacted for 2 hours at 60° C. Successively the solvent was evaporated, as described herein, and the residue was reacted with TiCl$_4$ at 110° C. as in Example 2(a).

After the washings [see Example 1(a)] with heptane, it was found that all traces of free TiCl$_4$ were removed.

(b) Polymerization of propylene in hexane (solvent)

1 ml of the suspension in heptane of the catalyst component prepared in 5(a) was utilized under the polymerization test conditions described in 1(b). After a 4-hour polymerization, 176 g of dry polymer were obtained, that contained the following catalyst residues: Ti=36.2 ppm; Mg=137 ppm; Cl=263 ppm; the yield was 27,600 g of polymer/g of Ti, the residue of the extraction with boiling heptane being 90% by weight.

EXAMPLE 6

(a) Preparation of the catalyst component 8.1 g (200 m.moles) of MgO, pure product of the commercial type, were treated with a solution consisting of 3 g (20 m.moles) of ethyl benzoate and of 18.44 g (400 m.moles) of EtOH diluted in 50 ml of heptane, at a temperature of 80° C. for 2 hours. Successively, the whole was cooled to 80° C. and, under stirring and in 15 minutes, 181 ml (1.65 moles) of TiCl$_4$ were dropped in. Gaseous HCl evolved while the mixture temperature was brought to 110° C.; at this temperature gaseous HCl was directly introduced into the suspension at a feeding rate of 1 g. mole/hour for 2 hours, corresponding to 73 g of HCl in the aggregate.

After stopping the HCl feed, the suspension was diluted with 45 ml of $C_7+$ (heptane) and filtered at 110° C. The solid residue was treated with 181 ml of $TiCl_4$ for 2 hours at 110° C. The solid was then washed three times with heptane (200 ml each time) at 80° C. and five times at room temperature.

(b) Polymerization of propylene in hexane (solvent)

1 ml of the suspension in heptane of the catalyst component prepared in 6(a) was utilized under the same polymerization test conditions as described in 1(b), with the exception that a temperature of 70° C. was employed.

After a 4-hour polymerization, there were obtained 251 g of dry polymer containing the following catalyst residues: Ti=35 ppm; Mg=57 ppm; Cl=175 ppm; the yield was 28,400 g of polypropylene/g of Ti, the residue of the extraction with boiling heptane was equal to 93% by weight.

EXAMPLE 7

(a) Prehalogenation of MgO by treatment with HCl 80.5 g (600 m.moles) of commercial MgO were reacted in a fluid bed 500 ml reactor at 180° C. and for 2 hours with a HCl gaseous stream (2.14 moles/h) diluted with nitrogen, in a ratio by volume equal to 2 HCl:1 $N_2$. It was cooled in a stream of nitrogen only. The recovered solid product revealed on analysis the following composition: Mg=42.75 g/100 g; Cl=29.50 g/100 g; $H_2O$=12.0 g/100 g.

(b) Preparation of the catalyst component

In a 250-ml flask, under stirring, 15.4 g of the product obtained in Example 7 (a) were reacted with a solution consisting of 4.05 (27 m.moles) of ethyl benzoate and of 12.45 g (270 m.moles) of EtOH diluted in 100 ml of hexane, at a temperature of 60° C. for 2 hours. The solvent was then evaporated at room temperature, under vacuum, at a residual partial pressure of 40 mm Hg.

30 g of solid product were recovered and introduced into a reactor as described in 1 (a), and reacted with 181 ml (1.65 moles) of $TiCl_4$ at 110° C. for 2 hours. Successively, the mass was diluted with 45 ml of heptane and at 110° C. the solid was separated by filtration. All traces of $TiCl_4$ were removed by repeatedly washing with heptane (200 ml each time), namely 3 times at 80° C. and 5 times at room temperature.

From a portion of the catalyst component suspension the solvent was evaporated at 30° C. under vacuum (20 mm Hg). On analysis the solid residue proved to have the following composition: Ti=11.70 g/100 g, Mg=17.75 g/100 g, Cl=55.0 g/100 g, ethyl benzoate=3.53 g/100 g.

(c) Polymerization of propylene in hexane (solvent)

0.5 ml of the suspension of the catalyst component prepared in 7 (b) was used under the same polymerization test conditions as illustrated in 1 (b).

After a 4-hour polymerization, 352 g of dry polymer were obtained. It contained the following catalyst residues: Ti=25 ppm; Mg=31 ppm; Cl=114 ppm. The yield was 40,000 g of polypropylene/g of Ti and the residue of the extraction with boiling heptane was equal to 93% by weight.

EXAMPLE 8

(a) Preparation of the catalyst component

In a 500 ml reactor as described in 1 (a), 39 g of a support based on MgO (20.8%) (an aluminum-magnesium silicate in micro-spheroidal form, marketed by Grace-Davison under item SM/30) were reacted with 476 g of $SOCl_2$ at 77° C. for 3 hours.

After having removed all traces of $SOCl_2$ by means of several washings with hexane at 60° C., the residual solid product was suspended in a solution consisting of 3 g of ethyl benzoate (20 m.moles) and 9.22 g of EtOH (200 m.moles) diluted with 100 ml of hexane and reacted at 60° C. for 2 hours.

The solvent hexane was evaporated and the solid residue was then treated with 181 ml of $TiCl_4$ (1.65 moles) at 110° C. for 2 hours, whereupon the suspension was diluted with 45 ml of heptane and filtered at 110° C.

(b) Polymerization of propylene in hexane (solvent)

3 ml of the suspension in heptane of the catalyst component prepared in 8 (a) were used under the same polymerization test conditions as illustrated in 1 (b).

After a 4-hour polymerization, 358 g of dry polymer exhibiting a narrow particle size distribution and a microspheroidal form were obtained, the yield being of 10,000 g of polymer/g of Ti and the residue of the extraction with boiling heptane being 86.5%.

(c) Polymerization of ethylene in hexane (solvent)

200 mg of the dry catalyst component prepared in 8 (a) (10.8 mg of Ti) were suspended in 1,000 ml of hexane containing 1.5 g of an aluminum-butyls mixture [see Example 1 (b)] and the whole was then introduced into a 2.5-liter autoclave, in a slight ethylene atmosphere. The temperature was brought to 75° C., then hydrogen was fed up to 3 atm gauge and ethylene up to 13 atm gauge in the aggregate. Ethylene was fed, keeping a pressure of 13 atm gauge for 4 hours. The polymeric slurry was discharged, and the polymer was separated from the solvent by filtration.

After drying, 347 g of polyethylene having a narrow particle size distribution were obtained, the yield being of 32,100 g of polyethylene/g of Ti.

EXAMPLE 9

(a) Preparation of the catalyst component 8.1 g of MgO (200 m.moles), a pure commercial type product, were reacted with a solution made up of 3 g of ethyl benzoate (20 m.moles) and of 9.22 g of EtOH (200 m.moles) diluted with 100 ml of hexane, at a temperature of 60° C. for 2 hours. The solvent was evaporated at room temperature under a slight vacuum (40 Torr.). The solid residue was reacted with $TiCl_4$ at 110° C. as described in Example 2 (a). After five washings with heptane (200 ml each washing), two at 80° C. and three at room temperature, a portion of the suspension was dried, and, on analysis, the residual solid product was found to have the following composition: Ti=0.9 g/100 g; Mg=38 g/100 g; Cl=47.4 g/100 g; ethyl benzoate=1.8 g/100 g.

(b) Polymerization of propylene in hexane (solvent)

1.5 ml of the suspension in heptane of the catalyst component prepared in 9 (a) were utilized under the same polymerization test conditions as illustrated in 1 (b). After a 4-hour polymerization, there were obtained 75 g of dry polymer that contained the following catalyst residues: Ti=9.5 ppm; Mg=360 ppm; Cl=420 ppm. The yield was 105,263 g of polypropylene/g of Ti, and the residue of the extraction with boiling heptane amounted to 86.5% of the total (or crude) polymerizate.

EXAMPLE 10

(a) Preparation of the catalyst component 8.1 g of MgO (200 m.moles), a pure commercial type product, were reacted with 238 g (2 moles) of $SOCl_2$ at 77° C. for 2 hours.

After removal, by means of washings with hexane at 60° C., of all traces of $SOCl_2$, the residual solid product was reacted with 3 g of ethyl benzoate (20 m.moles) diluted with 100 ml of hexane, at a temperature of 60° C. for 1 hour. Successively the solvent was evaporated at 30° C. and under vacuum (40 Torr of residual partial pressure). The solid dry product was treated with 110 ml of $TiCl_4$ (1 mole) at 110° C. for 2 hours. $TiCl_4$ was then removed by filtration at 100° C. The solid residue was washed with heptane (200 ml each time) three times at 80° C. and three times at room temperature.

(b) Polymerization of propylene in hexane (solvent)

1.1 ml of the suspension in heptane of the catalyst component prepared in 10 (a) were utilized under the same polymerization test conditions as illustrated in 1 (b).

After a 4-hour polymerization, 142 g of dry polymer were obtained. It contained the following catalyst residues: Ti=35 ppm; Mg=183 ppm; Cl=290 ppm. The yield was 28,571 g of polypropylene/g of Ti; the residue of the extraction with boiling heptane being equal to 86% of the total (or crude) polymerizate.

EXAMPLE 11

(a) Preparation of the catalyst component 4.05 g of MgO (100 m.moles) were reacted with 37.5 g of ethyl benzoate (250 m.moles), diluted with 50 ml of heptane, at a temperature of 80° C. for 2 hours.

Successively, 250 ml of $TiCl_4$ (2.28 moles) were introduced, bringing the temperature to 110° C. for 2 hours. The mass was filtered at 110° C. and the solid thus separated was treated again with $TiCl_4$ as described herein. The separated solid was repeatedly washed with heptane (200 ml each time): 3 times at 80° C. and 3 times at room temperature.

(b) Polymerization of propylene in hexane (solvent)

1.5 ml of the suspension of the catalyst component prepared in 11 (a) were utilized under the same polymerization test conditions as described in 1 (b).

After 4 hours, 30 g of dry polymer containing the following catalyst residues were obtained: Ti=12 ppm; Mg=348 ppm; Cl=700 ppm. The yield was 83,200 g of polypropylene/g of Ti; the residue of the extraction with boiling heptane was 94.5% of the total or crude polypropylene. The intrinsic viscosity was 1.9 dl/g.

EXAMPLE 12

(a) Preparation of the catalyst component 8.1 g of MgO (200 m.moles) were employed, operating under the same conditions as of Example 6 (a), with the exception that EtOH was excluded from the reaction mixture.

(b) Polymerization of propylene in a solvent 5 ml of the suspension in heptane of the catalyst component prepared in 12 (a) were utilized under the polymerization test conditions of 1 (b), except that the temperature was raised to 70° C.

At the conclusion of the polymerization run, 193 g of dry polymer were obtained, containing the following catalyst residues: Ti=13.2 ppm; Mg=908 ppm; Cl=1,075 ppm. The yield was 75,757 g of polypropylene/g of Ti, with a residue of the extraction with boiling heptane of 91.5% of the total or crude polymerizate.

The polymer was characterized by the following properties:
intrinsic viscosity=2.2 dl/g
apparent density=0.46 kg/l.

EXAMPLE 13

(a) Preparation of the catalyst component

A microspheroidal support (20–70$\mu$) of a complex $MgCl_2.1.237\ H_2O$ (18.8% of $H_2O$), calcined at 400° C. for 1 hour was utilized.

In a 250-ml flask, equipped with a stirrer, 10.2 g of the calcined product were treated with a solution of 4.6 g (100 m.moles) of EtOH diluted with 50 ml of heptane at a temperature of 0° C. for 1 hour, under stirring, whereupon 3 g (20 m.moles) of ethyl benzoate were added to the suspension, raising the temperature to 60° C. for 1 hour.

Successively, 154 ml of $TiCl_4$ (1.4 moles) were introduced, raising the temperature to 110° C. for 2 hours. The solid was then decanted, removing the $TiCl_4$ solution along with the by-products therein dissolved, by siphoning at 110° C.

(b) Polymerization of propylene in hexane (solvent)

0.6 ml of the suspension of the catalyst component in heptane prepared in 13 (a) were utilized under the polymerization test conditions of 1 (b).

After 4 hours, 433 g of dry polymer were obtained. It contained the following catalyst residues: Ti=4.4 ppm; Mg=66 ppm; Cl=150 ppm. The yield was 227,000 g of polypropylene/g of Ti; the residue of the extraction with boiling heptane was equal to 90.5% of the total or crude polymerizate.

EXAMPLE 14

(a) Preparation of the catalyst component 95.3 g of anhydrous $MgCl_2$ (1 mole) and 40.3 g of chemically pure MgO (1 mole) were introduced into a 1-liter vibrating ball mill. Such mixture was co-ground for 30 hours and then discharged from the mill.

13.56 g of the above mixture (9.53 g of $MgCl_2$+4.04 g of MgO) were reacted, in a 250-ml flask, with a solution consisting of 3 g of ethyl benzoate (20 m.moles) and 9.22 g of EtOH diluted with 100 ml of n-hexane, at a temperature of 60° C. for 2 hours. The solvent was evaporated from the suspension at room temperature under a slight vacuum (40 Torr of residual pressure), recovering at the conclusion 25.43 g of solid product.

The solid product was charged into a jacketed 500-ml reactor equipped with a porcelain filtering fritted bottom, 181 ml (1.65 moles) of $TiCl_4$ were then introduced and the mixture was brought to a temperature of 110° C. for a 2-hour contact time, whereupon the suspension was diluted with 45 ml of heptane and the solid was separated by filtration at 110° C. The catalyst component was washed 4 times with heptane at 80° C. and 3 times at room temperature (employing 200 ml of heptane each time).

(b) Polymerization of propylene in hexane (solvent)

0.6 ml of the suspension of the catalyst component prepared according to Example 14 (a) were employed under the polymerization test conditions described in 1 (b).

After a 2.5-hour polymerization, 432 g of dry polymer were obtained. It contained the following catalyst residues: Ti=4.5 ppm; Mg=25 ppm; Cl=105 ppm. The yield was 222,000 g of polypropylene/g of Ti. The solid residue of the extraction with boiling heptane was equal to 89% of the total (or crude) polymerizate.

EXAMPLE 15

(a) Preparation of the catalyst component

Synthetic hydrotalcite of formula $Mg_6Al_2CO_3.(OH)_{16}.4H_2O$ (produced by Kyowa Kasei Ind. Co. Ltd.) was used as starting material and was calcined in a dry air atmosphere at 450° C. for 24 hours.

11.5 g. of the product ($6MgO.Al_2O_3$), obtained by the calcination of the hydrotalcite, were weighed and suspended in a solution consisting of 4.2 g of ethyl benzoate (28 m.moles) and 12.9 g of EtOH diluted with 50 ml of heptane. The suspension, contained in a jacketed 500-ml reactor equipped with a filtering fritted bottom, was heated to 60° C. for 2 hours, whereupon 181 ml (1.65 moles) of $TiCl_4$ were introduced into the reactor at constant temperature. The temperature was then rapidly raised to 110° C. with simultaneous feeding of gaseous HCl, directly into the reaction mixture, at a rate of 1 mole/hour for 2 hours.

After stopping the feeding of HCl, the mixture was diluted by the addition thereto of 45 ml of heptane, whereupon it was filtered at 110° C., separating the solid component from the products soluble in $TiCl_4$.

After diluting the reaction mixture with 45 ml of heptane, it was filtered again at 110° C., separating the solid from the excess of $TiCl_4$. The catalyst component was washed with heptane (200 ml each treatment) 4 times at 80° C. and 3 times at room temperature, to remove all traces of free $TiCl_4$.

(b) Polymerization of propylene in hexane (solvent)

2 ml of the suspension in heptane of the catalyst component prepared as described in Example 15 (a) were utilized under the polymerization test conditions described in 1 (b).

After 4 hours, there were obtained 243 g of dry polymer which contained the following catalyst residues: Ti=13 ppm; Mg=133 ppm; Cl=222 ppm. The yield was 77,000 g of polypropylene/g of Ti. The solid residue of the extraction with boiling heptane was equal to 88% of the total (or crude) polymerizate.

EXAMPLE 16

(a) Preparation of the catalyst component

The microspheroidal complex $MgCl_2.1.24\ H_2O$ (20–70μ) was calcined at 525° C. for 3 hours. The resulting product exhibited the following composition: Mg=51.35 g/100 g; Cl=17.15 g/100 g. The atomic ratio between Cl:Mg was equal to 0.229.

In a 250-ml flask, 11 g of the product obtained by calcining $MgCl_2.1.24\ H_2O$ were reacted at 60° C. for 2 hours with a solution consisting of 2.74 g (18.25 m.moles) of ethyl benzoate and 8.4 g (182 m.moles) of EtOH diluted with 90 ml of hexane. After evaporation of the solvent at 20° C. under vacuum (40 Torr residual pressure), 21.35 g of solid product were weighed and put into a 500-ml reactor (according to Example 16 (a), where they were reacted with 167 ml (1.52 moles) of $TiCl_4$ at 110° C. for 2 hours. Before separating the solid from the $TiCl_4$ solution containing the reaction by-products in dissolved form, 42 ml of heptane were introduced, whereupon the whole was filtered at 110° C.

(b) Polymerization of propylene in hexane (solvent)

1 ml of the catalyst component suspension, prepared according to Example 16 (a), was utilized under the test conditions described in 1 (b).

After 4 hours, 336 g of dry polymer were obtained. It contained the following residual components of the catalyst: Ti=4.3 ppm; Mg=62 ppm; Cl=122 ppm, the yield being 232,000 g of polypropylene/g of Ti, and the residue of the extraction with boiling heptane being 90.5% of the total (or crude) polymerizate.

The polymer was further characterized by the following properties:
intrinsic viscosity, 2.1 dl/g
melt-flow index, 3.7 g/10'
flexural rigidity, 12.930 kg/cm²
apparent density, 0.38 kg/l.

EXAMPLE 17

(a) Preparation of the catalyst component

The starting material was 57.7 g of a complex $MgCl_2.1.24\ H_2O$ which, after being put into a fluid bed reactor with a 200 l/h nitrogen flow (linear velocity=4.4 cm/sec.) humidified at 20° C., was heated to 220° C. for 6.5 hours, to 270° C. for 1 hour, and to 270° C. with dry nitrogen for another hour. 36.3 g of a product were recovered that, subjected to chemical analysis, exhibited the following compositions: Mg=28.85 g/100 g; Cl=48.05 g/100 g; OH=23.25 g/100 g. 30 g of this product were co-ground for 60 hours with 33.6 g (353 m.moles) of anhydrous $MgCl_2$ in a vibrating ball mill having a capacity of 1 liter.

17.3 g of the mixture ($MgCl_2$+MgClOH) obtained after the cogrinding were introduced into a 250-ml flask and treated with a solution consisting of 6 g (40 m.moles) of ethyl benzoate and 9.2 g (200 m.moles) of EtOH diluted with 100 ml of n-hexane, at a temperature of 60° C. for 2 hours. The solvent was then evaporated at 25° C. under vacuum, at a residual pressure of 40 Torr.

32 g of a solid product were recovered and introduced into a 500-ml reactor equipped with a filtering fritted bottom; 164 ml of $TiCl_4$ were then rapidly dropped in and the suspension was brought to a temperature of 110° C. for 2 hours, under stirring.

Successively, the mixture was diluted with 41 ml of heptane and filtered at 110° C. The solid was suspended with 41 ml of heptane and filtered. The resulting solid was then washed with heptane at 80° C. 4 times (150 ml each time) and at room temperature 3 times.

(b) Polymerization of the product in solvent 0.75 ml of the suspension in heptane of the catalyst component prepared in 17 (a), was used under the polymerization test conditions described in 1 (b), with the exception that the temperature was raised to 70° C.

After a 4-hour polymerization, there were obtained 298 g of dry polymer that contained the following catalyst residual components: Ti=5.5 ppm; Mg=43 ppm; Cl=185 ppm.

The yield was 181,500 g of polypropylene/g of Ti, and the residue of the extraction with boiling heptane was equal to 93.5% by weight of the total (or crude) polymerizate.

What we claim is:

1. Components for catalysts for polymerizing olefins comprising the product of the reaction between at least the following substances:
   (a) a halogenated Ti compound selected from the group consisting of Ti tetrahalides and Ti haloalcoholates;
   (b) a solid support comprising the following essential components or mixtures thereof: component (b1) containing (A) an oxygenated Mg compound selected from the group consisting of MgO, mixed oxides of Mg, Al and/or Si, Mg hydroxide, Mg hydroxychloride or bromide, Mg nitrate, Mg phosphates, Mg silicates, Mg carboxylates and the products obtained from the dehydration, under hydrolysis conditions, of hydrated Mg halides, and (B) an adduct between a Mg dihalide and at least one hydrocarbyl electron-donor compound or the product of the decomposition of said adduct to Mg dihalide; or
   component (b2) obtained by reacting an oxygenated Mg compound as defined in (A) with a hydrocarbyl electron-donor compound free from active hydrogen atoms (component ED) or with mixtures thereof with an electron-donor compound containing active hydrogen atoms (compound HED);
the reaction system comprising also a compound ED, at least when said compound ED or derivatives thereof are not used in preparing support (b), the amount of compound ED present in the catalyst component, in a form non-extractable with $TiCl_4$ at 80° C., being in the range of from 0.05 to 5 moles per mole of Ti compound existing after the treatment at 80° C.

2. A catalyst component according to claim 1, in which the adduct existing in support (b1) contains compound HED and/or ED each in amounts of at least 0.1 mole per mole of Mg dihalide, the molar ratio between the Mg oxygenated compound and the Mg dihalide either combined or not being comprised between 0.05:1 and 20:1.

3. A catalyst component according to claim 1, in which product (b2) contains compound ED or mixtures thereof with HED in amounts ranging from 0.1 to 5 moles of ED and from 0.1 to 5 moles of HED.

4. A catalyst component according to claim 1, in which less than 50% of the Ti compound is soluble in $TiCl_4$ at 80° C.

5. A catalyst component according to claim 1, in which less than 50% of the Ti compound is soluble in $TiCl_4$ at 135° C.

6. A catalyst component according to claim 1, in which support (b1) is prepared by halogenating an oxygenated Mg compound of (b1), and by reacting the Mg dihalide with a compound HED and/or ED, either simultaneously with the halogenation or successively.

7. A catalyst component according to claim 1, in which support (b1) is prepared by dehydration, under hydrolysis conditions, of Mg hydrated dihalides and by reaction of the Mg dihalide with compound HED and/or ED.

8. A catalyst component according to claim 7, in which the Mg hydrated halide is $MgCl_2 \cdot nH_2O$, wherein n is comprised between 0.5 and 6, and the dehydration is effected by heating the Mg hydrated halide to a temperature ranging from 350° to 500° C.

9. A catalyst component according to claim 8, in which the dehydration is effected by heating the Mg hydrated halide to a temperature ranging from 350° to 450° C.

10. A catalyst component according to claim 1, in which support (b1) is prepared by mixing the oxygenated Mg compound with the adduct of (b1).

11. A catalyst component according to claim 1, in which support (b1) is prepared by reacting the Mg dihalide with compound HED and/or ED in the presence of the oyxgenated Mg compound.

12. A catalyst component according to claim 1, in which compound ED is reacted, in either combined or uncombined form, with a pre-formed support (b1).

13. A catalyst component according to claim 1, in which the Ti compound is $TiCl_4$.

14. A catalyst for polymerizing olefins, prepared by reacting a component as defined in claim 1 with an Al-alkyl compound.

15. A catalyst according to claim 14, in which the Al-alkyl compound is an Al-trialkyl or mixtures thereof with an Al-dialkyl halide complexed for 20–100% with an electron-donor compound selected from the esters of benzoic acid.

16. A catalyst according to claim 14, in which the Al/Ti ratio is comprised between 1 and 1,000.

17. A catalyst according to claim 15, in which the Al/Ti ratio is comprised between 1 and 1,000.

* * * * *